United States Patent

[11] 3,632,254

| [72] | Inventors | George W. Woodham<br>Evansville;<br>James L. Stuart, Boonville, both of Ind. |
|---|---|---|
| [21] | Appl. No. | 2,783 |
| [22] | Filed | Jan. 14, 1970 |
| [45] | Patented | Jan. 4, 1972 |
| [73] | Assignee | Dart Industries, Inc.<br>Los Angeles, Calif. |

[54] APPARATUS FOR PRODUCING FIBER REINFORCED PLASTICS
10 Claims, 5 Drawing Figs.

[52] U.S. Cl. .................................................. 425/205, 425/382
[51] Int. Cl. .................................................. B29f 3/02
[50] Field of Search .................................................. 18/12 SM, 12 SS, 12 SB, 30 SM, 30 JM, 30 JS, 30 JT; 264/143

[56] References Cited
UNITED STATES PATENTS

| 3,487,503 | 1/1970 | Barr et al. | 18/12 SM |
| 3,445,890 | 5/1969 | Heston et al. | 18/12 SM |
| 2,838,794 | 6/1958 | Munger et al. | 18/12 SM |
| 2,868,517 | 1/1959 | Lasch | 18/12 SS X |

*Primary Examiner*—Robert D. Baldwin
*Assistant Examiner*—Norman E. Lehrer
*Attorneys*—Ronald J. Carlson, Fred S. Valles and Richard A. Dannells, Jr.

ABSTRACT: An apparatus is disclosed for producing fiber reinforced plastics wherein the fibers are more uniformly dispersed throughout the resin. Briefly, the apparatus includes an extrusion means and a means for feeding glass fibers and thermoplastic resin thereto, said extrusion means comprising a two-stage extruder having a multiflight extruder screw extending through the two stages and defining within each stage, respectively, a feed zone, a transition zone and a metering zone, the compression ratio in the first stage being in the range of about 3:1 to 5:1, the compression ratio in the second stage being in the range of about 1.5:1 to 3.5:1, and the ratio of the flight depth of the extruder screw in the second stage feed zone to the flight depth of the extruder screw in the first stage feed zone being in the range of about 1:1.25 to 1:2.5, said extruder screw being provided with flow deflection means in the second stage metering zone to cause uniform dispersion of the fibers throughout the resin.

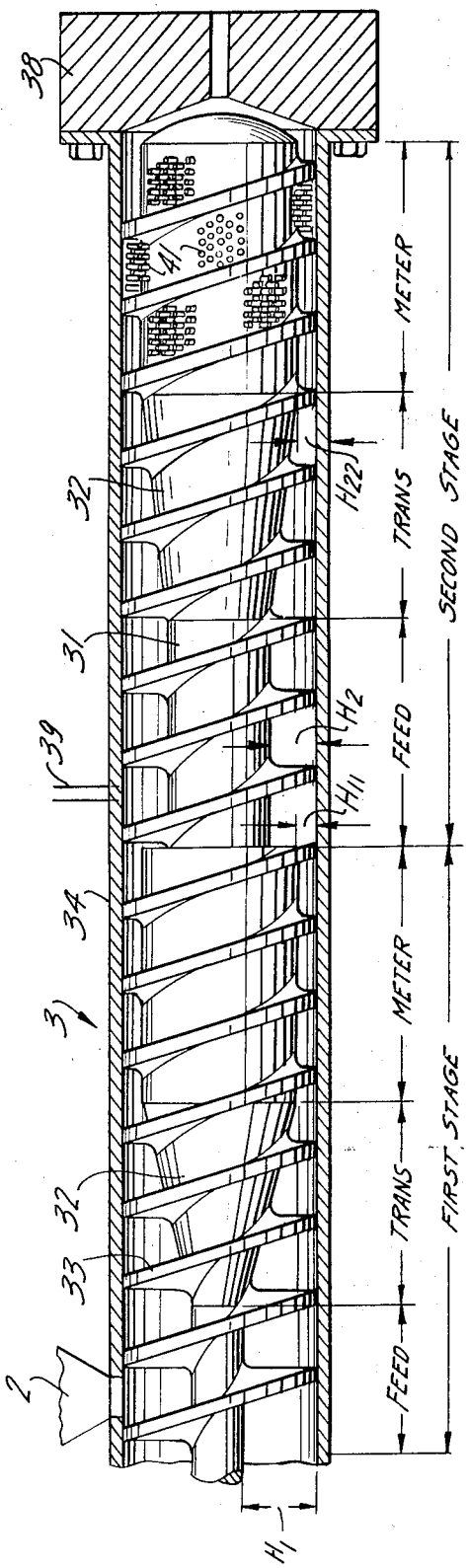
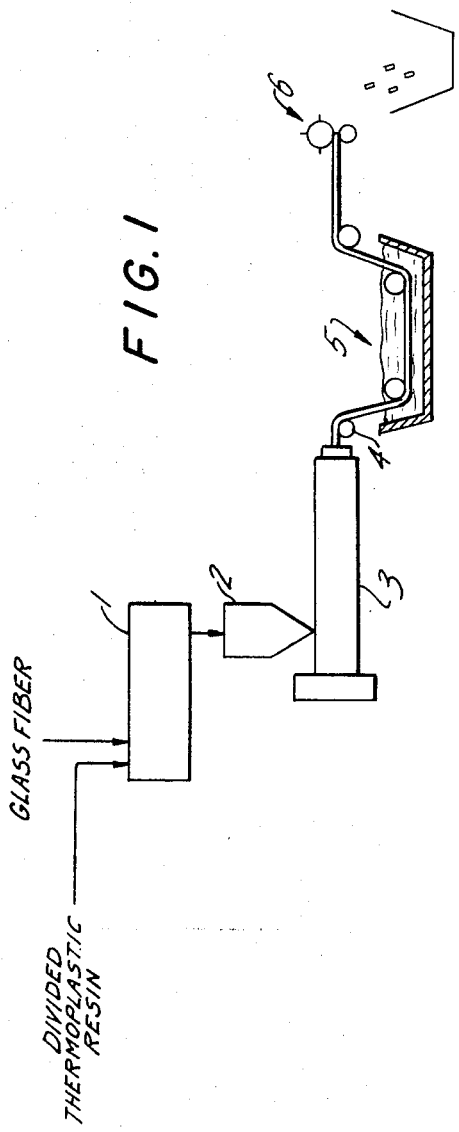

INVENTORS
GEORGE W. WOODHAM
JAMES L. STUART
BY
ATTORNEY

APPARATUS FOR PRODUCING FIBER REINFORCED PLASTICS

This invention relates to improvements in an apparatus for continuously producing glass fiber reinforced thermoplastic compositions which are suitable for extrusion or molding operations, particularly injection molding. More specifically, the invention relates to improvements in the screw of an extrusion apparatus for the continuous production of such compositions from thermoplastic particles and glass fibers of relatively short length.

Glass fiber reinforced thermoplastic compositions have been produced in the past by extrusion techniques involving feeding the glass fibers and thermoplastic resin to an extruder, melting the resin and dispersing the fibers throughout the resin within the extruder, and then extruding the mixture into a form suitable for subdivision into appropriate sizes for handling and subsequent molding or extrusion operations. In order to produce good reinforced compositions it is essential that the fibers be well dispersed in a substantially uniform manner throughout the thermoplastic resin. In the above-mentioned processes the extruder screw is primarily relied on to obtain dispersion of the fibers throughout the resin melt as the mixture passes therethrough. Unfortunately, the extruder screws employed heretofore have not always produced the desired degree of dispersion thus resulting in inferior reinforced compositions having voids therein and fibers extending outward through the surface rendering them susceptible to swelling. In addition, the extrusion operation does not always function smoothly due to surging problems and thus results in a discontinuous production rate.

An apparatus which goes far in overcoming this problem among others is disclosed in applicants' copending application Ser. No. 872,683, filed Oct. 30, 1969 entitled "Continuous Production of Glass Fiber Reinforced Thermoplastics," the disclosure of which is incorporated herein by reference. In that apparatus the extruder screw has two stages each of which has a feed zone, transition zone and metering zone. Of critical importance to the extruder screw is that the first stage is designed so that the compression ratio is in the range of about 3:1 to 5:1, the second stage is designed to have a compression ratio in the range of about 1.5:1 to 3.5:1, and the ratio between the flight depth of the screw in the second stage feed zone to the first stage feed zone is in the range of about 1:1.25 to 1:2.5. While the apparatus disclosed in the copending application does produce glass fiber reinforced compositions on a continuous basis with better results than heretofore known extrusion systems, the dispersion of the glass fibers in the resin has not been altogether satisfactory, particularly with such thermoplastic resins as polyolefins, e.g., polyethylene, polypropylene, etc.

In accordance with this invention improvements are provided in the apparatus disclosed in the aforementioned copending application whereby good dispersion between the glass fibers and the thermoplastic resin is obtained. Briefly, the improvements include providing flow deflection means between the screw flights in the second stage metering zone of the two-stage extruder screw. The deflection means are positioned in such a manner as to cause the flow of the mixture of molten resin and glass fibers along the extruder screw to periodically deviate from its normal flow path and thus produce an intimate intermingling of the fibers with the resin. As a result, the fibers become intimately dispersed throughout the resin in a substantially uniform manner without the necessity for undue durations of high shear which may lead to excessive fiber damage. The final extruded mixture has good appearance, there being substantially no protruding fibers or voids upon visual examination of the product.

In one embodiment of the invention the deflection means may comprise studs which are mounted on the central shaft of the extruder screw in the region of the second stage metering zone and extend substantially radially outward therefrom. These studs are arranged in such a manner that the mixture of molten or substantially molten resin and glass fibers must follow a multitude of tortuous intermingling paths while being conveyed forward in the extruder.

Alternatively, the deflection means may comprise damming strips. The damming strips generally comprise a series of relatively thin (narrow) strips also secured to the central shaft of the extruder screw in the region of the second stage metering zone and extend in a generally transverse direction between the screw flights. The height and length of the strips is such that the mixture of molten resin and glass fibers must periodically deviate from its normal flow path to pass over and around the strips.

The invention will be described in further detail later wherein other features and advantages will become apparent, especially when taken in conjunction with the accompanying drawings wherein:

FIG. 1 illustrates a schematic diagram of the apparatus to which the improvements of this invention applies;

FIG. 2 illustrates a partial cross-sectional view of the specific extruder employed in the apparatus and embodying one embodiment of the improvements of this invention;

Figure 3:
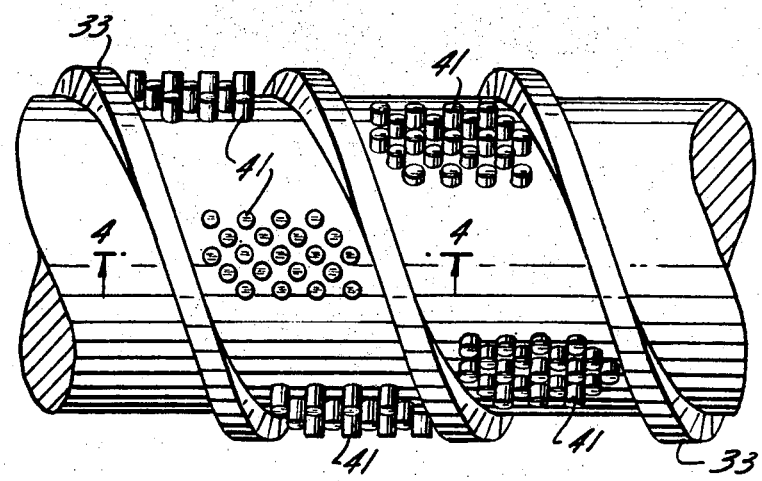
FIG. 3 illustrates an enlarged portion of the extruder screw shown in FIG. 2 having studs mounted thereon in accordance with this invention.

With reference to FIG. 1, a thermoplastic resin in solid divided form and glass fibers of relatively short length are initially physically mixed. As illustrated, this is accomplished by mechanically tumbling them together in a mixer 1, such as a ribbon blender. The mixture of glass fibers and resin is then fed to a standard feed hopper 2 of an extruder 3. Alternatively, the resin and fibers can be metered directly into a feed chute or the extruder in a manner whereby physical mixing is accomplished through gravity flow of the material into the extruder. This latter method is particularly applicable where the glass fibers are a type which may become easily fractured by the action of a mixer. In any event, the mixture is then processed through the extruder wherein the resin is melted and the fibers are dispersed throughout the resin melt with the aid of the improvement of this invention to be described later in further detail. The mixture is extruded in a suitable form 4 such as a sheet, strip, strand, or the like, and solidified by passing it through a conventional water bath 5 or other suitable cooling means. Thereafter, the extrudate is fed to a conventional cutter 6 and reduced to the desired size for subsequent molding or extrusion operations. The desired size may take several forms varying from relatively large sheets to small pieces such as pellets and granules for molding.

The extruder, as shown in detail in FIG. 2, is of standard construction with the exception of the screw. In general, the extruder 3 includes a barrel portion 34 surrounding the extruder screw 31. The screw 31 comprises a central shaft 32 having a series of screw flights 33 spirally extending along the shaft throughout the length of the barrel 34. The extruder barrel is provided at its forward end with a die plate 38 having suitable extrusion orifices through which the material being processed is ultimately extruded. In addition, a vent 39 is provided in the extruder barrel at a point corresponding to the feed zone of the second stage.

With specific reference to the extruder screw 31 as shown in FIG. 2, it is pointed out that the screw is designed so that the first stage has a compression ratio in the range of about 3:1 to 5:1, the second stage has a compression ratio in the range of about 1.5:1 to about 3.5:1, and the ratio of the flight depth of the second stage feed zone ($H_2$) to the flight depth of the first stage feed zone ($H_1$) is in the range of about 1:1.25 to 1:2.4. Preferably, the first stage compression ratio is in the range of about 3.5:1 to 4.5:1, the second stage compression ratio is in the range of about 1.5:1 to 3:1, and the $H_2$:$H_1$ ratio is about 1:1.75 to 1:2. As illustrated, these parameters are provided by screw flights 33 of constant pitch and the variation in diameter of the central shaft 32. However, it will be understood that these parameters may also be provided by a combination of varying flight pitch and varying shaft diameter. All of this is fully described in applicants' copending application previously mentioned and reference may be had to that application for any further details of what has just been described and the function of the overall apparatus.

One embodiment of the improvements of this invention is also illustrated in FIG. 2 wherein the deflection means are shown as a plurality of deflection studs 41 extending outward from the central shaft of the extruder in a substantially radial direction. These deflection studs are located in the second stage metering zone since this is where the majority of the mixing takes place in the extruder. The particular arrangement and number of deflection studs is not important provided that there are a sufficient number present which are arranged in such a manner that several tortuous paths are defined within the valleys between the screw flights through which the mixture of molted resin and glass fibers must pass upon being processed through the extruder. For simplicity in describing and illustrating the invention only one arrangement has been shown, however, it will be understood that a great variety of arrangements may be used and will occur to those skilled in the art.

As illustrated, the deflection studs 41 are arranged in several spaced-apart groups located in the spirally extending valley areas between the screw flights 33. Each group comprises a plurality of studs positioned in rows wherein the studs of one row are offset from the studs of the adjacent rows so as to define a plurality of tortuous paths therethrough. This is shown more clearly in FIGS. 3 and 4. Thus, as the mixture of molten resin and glass fibers progressively moves forward along the extruder screw between the flights the groups of deflection studs are encountered which cause lateral movement of the mixture relative to the direction of original movement and the mixture becomes intermingled with itself.

Figure 4:
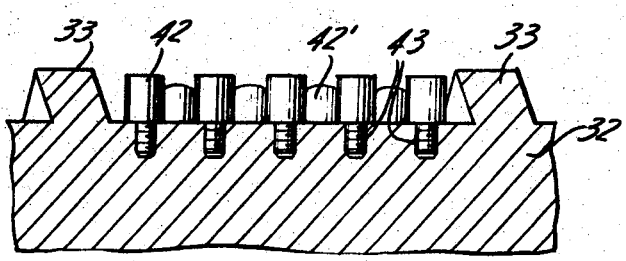
FIG. 4 is a partial cross-sectional view of that portion of the extruder screw shown in FIG. 3 and taken along line I—I.

With specific reference to FIG. 4, the studs are formed by small cylindrical sections 42 which are secured to the surface of the central shaft 32 of the extruder screw by threaded end portion 43. Cylindrical sections 42' of the studs in the next adjacent row are also shown in offset positions. The cylindrical sections of the studs extend outward in a radial direction from the surface of the shaft 32 to heights which are only slightly lower than the height of the screw flight 33, e.g., a few thousandths or hundredths of an inch preferably. In this manner it is assured that when the extruder screw is in operation within the extruder barrel the studs will not contact or scrape against the barrel wall yet will pass sufficiently close thereto to substantially prevent the passage of resin and glass fibers between the upper surfaces of the studs and the wall.

While the studs have been illustrated as cylindrical in shape it will be understood that other geometric configurations may also be employed to accomplish the same general function. For example, the cross section may be square, triangular, oval or any combination of straight and curved sides. It is preferable to have studs with curved or rounded sides so that the resin and glass fibers will flow more easily through the tortuous paths defined by the studs and reduce any possibility of blockage or surging of the material flowing through the extruder.

It is also pointed out that the studs need not be secured to the central shaft 32 by threaded end portions 43. Rather, they may be welded thereto, integrally formed thereon, or mechanically secured thereto in any other manner that may occur to those skilled in the art.

The above-described studs may also be mounted on the screw in a variety of known manners whereby they may be rotated to form different systems of tortuous paths. For example, studs having oval cross sections may be positioned with their longest dimensions in the direction of flow of the resin and glass fibers whereby less tortuous paths are defined. Alternatively, the studs may be rotated to a position wherein their longest dimension is transverse of the direction of flow of the resin and glass fibers thus providing more pronounced tortuous paths and greater turbulence in the flow.

In an alternative embodiment of the invention damming strips are employed in place of studs as the flow deflection means. These damming strips are specifically illustrated in FIG. 5 wherein there is shown a portion of the second stage metering zone including the central shaft 32' of the extruder screw having screw flights 33' spirally extending therealong. In between the screw flights there are provided a series of damming strips 50. These strips extend across the valleys between the screw flights preferably at a minor angle from a true transverse direction to the direction of flow of the resin and glass fibers. It is not essential that the strips extend the entire distance between the adjacent flights since their effectiveness in dispersing the fibers and resin will still be accomplished if there are passageways left at either or both ends or even intermediate the ends through which the resin-glass fiber may flow unrestricted. The height of the strips is such that the flow of resin and glass fibers is substantially restricted but still leaving sufficient room between the upper surface of the strip and the extruder wall to permit passage of the mixture. Preferably the height of the strips is in the range of 30 percent to 90 percent of the height of the screw flights. The strips are relatively narrow so as not to create unduly long durations under which the mixture is subjected to high shear conditions. Widths up to about 2 inches should be satisfactory. The precise dimensions of the strips may vary considerably and would be easily within the skill of the art for determination depending upon the precise nature of the materials being processed and the conditions employed.

The operation of the above apparatus without the deflection means of this invention is described in detail in applicants' aforementioned copending application. The improvements of this invention do not alter any of the functions of that basic operation but do indeed improve thereon in that the molten resin and the glass fibers are caused to more intimately comingle with each other and result in highly desirable extrudate wherein the fibers are well dispersed throughout the resin.

The above-described apparatus of this invention may be further modified to include a means to aid in insuring that substantially all of the resin becomes molten in the first stage of the extruder. Such means may comprise the same studs as employed in the second stage metering zone as the flow deflection means. The studs, used in this capacity, are arranged in the region of the first stage metering zone and in a similar manner as when employed as the flow deflection means in the second stage.

The improvements and advantages obtained with the use of this invention is readily demonstrated by the following examples:

EXAMPLE 1

For comparison, the present invention was not employed in this example. A mixture of 80 percent by weight polypropylene pellets and 20 percent by weight nominal one-fourth inch length commercially available glass fibers (type 832,OCF) were initially mechanically blended and continuously fed to a 3.5 inch, 24:1 L/D extruder of the type described in applicants' copending application. A two-stage extruder screw with constant flight pitch (3.5 inches) was employed and had the following specifications ($H_1$, $H_{11}$, $H_2$ and $H_{22}$ corresponding to those regions indicated in FIG. 2):

| Stage | Zone | No. of Flights | Flight Depth (In.) |
|---|---|---|---|
| First | Feed ($H_1$) | 4 | 0.59 |
|  | Trans. | 6 | — |
| Second | Meter ($H_{11}$) | 4 | 0.14 |
|  | Feed ($H_2$) | 4 | 0.35 |
|  | Trans. | 2 | — |

| | | | |
|---|---|---|---|
| | Meter ($H_{22}$) | 4 | 0.21 |

The compression ratio of the first stage was about 4.0:1, the compression ratio of the second stage was about 1.6:1, and the ratio of flight depth ($H_2$) to flight depth ($H_1$) was about 1:1.7.

The resin and glass fibers were processed through the extruder in a continuous manner and extruded into 10 strands having about ⅛-inch diameters with no surging being observed. The strands were then cooled and cut into pellets about one-eighth inch in length.

The pellets were visually observed to have a number of glass fibers extending outward from the surface thereof and a number of void areas. The glass fibers did not appear to be as well dispersed as would be desired.

EXAMPLE 2

The procedure of example 1 was repeated using the same equipment with the exception that the extruder screw was provided with a plurality of deflection studs in the metering zone of the second stage. The studs were cylindrical sections one-fourth inch in diameter and extending outward to a point about one sixty-fourth inch below the top of the screw flights. A total of about 98 studs were employed in five spaced-apart groups of 15 to 20 studs each. The studs in each group were arranged in three to five rows about 21/64 inch apart with the separation between studs in a row being about five-eighths inch. The studs in one row were off set from the studs in adjacent rows to provide a plurality of tortuous paths.

A mixture of 80 percent by weight polypropylene and 20 percent by weight glass fibers was processed through this extrusion apparatus and continuously extruded into 10 strands about one-eighth inch in diameter with no surging being observed. The strands were cooled and cut into pellets about one-eighth inch in length.

The pellets were visually observed to have substantially no fiber ends protruding from the surface. Void areas did not appear to be present and the glass fibers appeared well dispersed throughout the resin as compared to the pellets of example 1.

EXAMPLE 3

Figure 5:
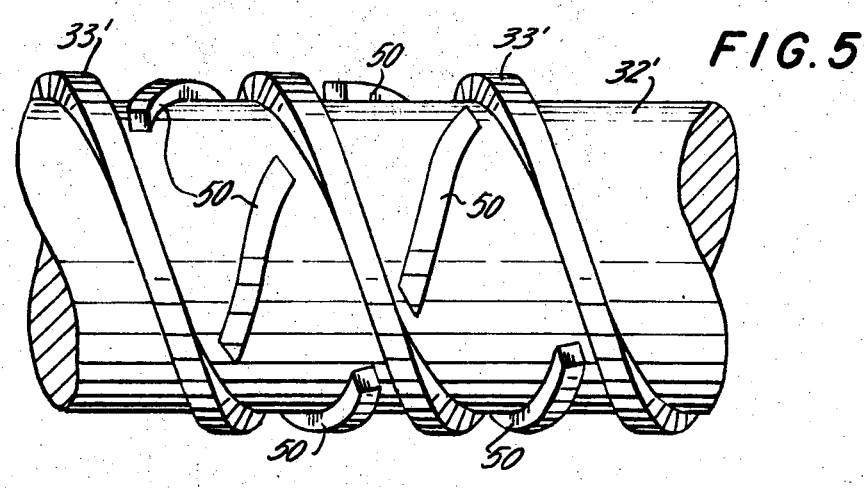
FIG. 5 is an enlarged portion of the extruder screw similarly as shown in FIG. 3 except that damming strips are shown as comprising the deflection means in the second stage metering zone of the extruder screw.

Similar good results to those of example 2 are obtained with the same resin glass mixture by repeating the procedure of example 1 using the same equipment except that four damming strips, equally spaced from each other, are used on the last two flight turns. The strips are about 1 inch wide and extend transversely from one flight screw to another as illustrated in FIG. 5 with about 1/16-inch clearance between the upper surface and the extruder barrel.

EXAMPLE 4

This example is also presented for comparison and represents an apparatus of the type described in applicants' copending application. A mixture of 70 percent by weight polyethylene pellets and 30 percent by weight glass fibers (type 832,OCF) was fed to a 6-inch, 24:1 L/D extruder having a two-stage screw of constant flight pitch (6 inches). The screw specifications were as follows:

| Stage | Zone | No. of Flights | Flight Depth (In.) |
|---|---|---|---|
| First | Feed ($H_1$) | 5 | 1.00 |
| | Trans. | 6 | — |
| | Meter ($H_{11}$) | 3 | 0.25 |
| Second | Feed ($H_2$) | 3 | 0.60 |
| | Trans. | 3 | — |
| | Meter ($H_{22}$) | 4 | 0.33 |

The compression ratio of the first stage was about 3.4:1, the compression ratio of the second stage was about 1.7:1, and the ratio of flight depth ($H_2$) to flight depth ($H_1$) was about 1:1.7.

The resin and glass fibers were processed through the extruder in a continuous manner and extruded into 29 strands having about ⅛-inch diameters with no surging being observed although not all the resin appeared to be in a molten form at the end of the first stage. The strands were then cooled and cut into pellets about one-eighth inch in length. (e.g., The pellets were visually observed and it was noted that glass fiber ends extended outward from the surface along with certain irregularities which appeared to be voids. The dispersion of glass fibers in the resin apparently was less than desired although better than what had previously been obtained prior to the invention in applicants' copending application.

EXAMPLE 5

The procedure of example 4 was repeated using the same apparatus with the exception that the extruder screw was provided with a plurality of deflection studs in the first stage metering zone to insure complete melting of the resin and a series of damming strips in the second stage metering zone to achieve good dispersion of the fibers in the resin.

The studs were rectangular blocks welded to the screw shaft and having nominal dimension of 1″×1″×¼″. There was clearance between the studs and the extruder wall. A total of about 16 studs were employed generally in a series of rows alternating in number from three to two to three and in an offset manner to provide a plurality of tortuous paths.

The strips were welded to the screw shaft between the flights in the second stage metering zone. Each strip had nominal dimensions of 1″×¼″×7″ and was positioned at a small angle to the direction transverse to the direction of flow of the material being processed. A total of four strips were employed in equally spaced positions (e.g. about 180°) over the last few flight turns in the metering zone.

The mixture of polyethylene (70 percent) and glass fibers (30 percent) was processed through this apparatus and continuously extruded into 29 strands about one-eighth inch in diameter with no surging being observed. The resin appeared to be in substantially molten form at the end of the first stage. The strands were cooled and cut into pellets about one-eighth inch in length.

Upon visual observation of the pellets the glass fibers appeared well dispersed throughout the resin with no protruding fiber ends and no observable voids as compared to the pellets of example 3.

EXAMPLE 6

Comparisons similar to that of examples 3 and 4 were performed for a mixture of 80 percent by weight polystyrene and 20 percent by weight glass fibers (type 885,OCF) and a mixture of 80 percent by weight styrene-acrylonitrile copolymer and 20 percent by weight glass fibers (type 885, OCF) with similar improved results.

Thus having described the invention in detail it will be understood by those skilled in the art that certain variations and modifications may be made without departing from the spirit and scope of the invention as described herein and defined in the appended claims.

We claim:

1. An apparatus for producing glass fiber reinforced thermoplastic compositions comprising:

A. means for feeding glass fibers and thermoplastic resin to an extrusion means, B. an extrusion means including a two-stage extruder having an uninterrupted multiflight extruder screw extending through the two stages and defining within each stage, in sequence, a feed zone, a transition zone and a metering zone; the flight depth and pitch in the first stage provide a compression ratio in the first stage in the range of about 3:1 to about 5:1, the flight depth and pitch in the second stage provide a compression ratio in the second stage in the range of about 1.5:1 to about 3.5:1 and the ratio of flight depth of the extruder screw in the second stage feed zone to the flight depth of the extruder screw in the first stage feed zone being in the range of about 1:1.25 to about 1:2.5 said extruder screw being provided in the second stage metering zone with flow deflection means to cause improved dispersion of the glass fibers throughout the resin as the fibers and resin are processed through said extrusion means.

2. An apparatus according to claim 2 wherein the flow detection means comprises a plurality of studs mounted on the extruder screw between the flights.

3. An apparatus according to claim 2 wherein the plurality of studs are arranged in groups, each group having a series of rows of studs with the studs of one row being offset to the studs of the adjacent rows.

4. An apparatus according to claim 2 wherein the studs are noncircular in cross section and are rotatably mounted on the extruder screw.

5. An apparatus according to claim 1 wherein the flow deflection means comprises a series of damming strips mounted on the extruder screw and extending generally transversely between adjacent screw flights.

6. An apparatus according to claim 5 wherein the damming strips are substantially equally spaced from each other.

7. An apparatus according to claim 1 wherein a plurality of studs are mounted on the extruder screw in the first stage metering zone.

8. An apparatus according to claim 2 wherein the flights of the extruder screw are of constant pitch throughout.

9. In combination, an apparatus for producing glass fiber reinforced thermoplastic compositions comprising:

A. supply means for providing continuous quantities of glass fibers and thermoplastic resin,
B. feed means for simultaneously and continuously feeding the glass fibers and thermoplastic resin to an extrusion means, said feed means including a hopper,
C. an extrusion means for receiving and processing the glass fibers and thermoplastic resin, said extrusion means including a two stage extruder having an uninterrupted multiflight extruder screw extending through the two stages and defining within each stage, in sequence, a feed zone, a transition zone and a metering zone; the flight depth and pitch in the first stage provide a compression ratio in the first stage in the range of about 3:1 to about 5:1, the flight depth and pitch in the second stage provide a compression ratio in the second stage in the range of about 1.5:1 to about 3.5:1, and the ratio of the flight depth in the second stage feed zone to the flight depth in the first stage feed zone being in the range of about 1:1.25 to about 1:2.5; said extruder screw being provided in the second stage metering zone with flow deflection means to cause improved dispersion of the glass fibers throughout the resin as the fibers and resin are processed therethrough, and
D. cutting means for severing the glass fiber reinforced composition extrudate into a desired size for subsequent molding and extrusion operations.

10. The invention according to claim 9 wherein the flight pitch of the extruder screw is constant throughout.

\* \* \* \* \*